United States Patent [19]
McFaul et al.

[11] 3,810,385
[45] May 14, 1974

[54] TRANSDUCER MEANS FOR ULTRASONIC EXTENSOMETER

[75] Inventors: Howard J. McFaul, Westminster; Donald C. Erdman; Evan B. Friedmann, both of Pasadena, all of Calif.

[73] Assignees: McDonnell Douglass Corporation; Donald C. Erdman Company, Inc., ; part interest to each

[22] Filed: Apr. 3, 1972

[21] Appl. No.: 240,871

Related U.S. Application Data
[62] Division of Ser. No. 117,635, Feb. 22, 1971.

[52] U.S. Cl. .............................. 73/71.5 U, 310/8.1
[51] Int. Cl. ........................................... G01n 29/00
[58] Field of Search ......... 73/71.5, 67.5, 67.7, 67.8, 73/67.9; 310/8.1, 9.1

[56] References Cited
UNITED STATES PATENTS
3,019,637  2/1962  Cook et al. ......................... 73/67.7
3,685,350  8/1972  Pettinato .......................... 73/71.5 U Primary Examiner—Richard C. Queisser
Assistant Examiner—Arthur E. Korkosz
Attorney, Agent, or Firm—D. N. Jeu; Walter J. Jason; Donald L. Royer

[57] ABSTRACT

Magnetic transducer assembly for use with an ultrasonic extensometer for measuring the elongation of a bolt or the like being tightened against structure which it fastens, the extensometer including a transducer magnetically coupled to one end of the bolt, a pulser/receiver for generating a periodic pulse signal which energizes the transducer that is subsequently energized by the echo pulse from the far end of the bolt to provide an echo signal which is received and amplified, indicating circuit means for detecting and providing a correct couple indication between the transducer and its associated bolt end, and measuring circuit means for displaying a variable duration meter signal responsively produced by the amplified echo signal and controlled in duration by a vernier signal responsively produced by the pulse signal after a predetermined delay which is adjustable to index the vernier signal a desired amount with respect to the meter signal so that when the bolt has been elongated the proper amount, the amplified echo signal then coincides with the indexing vernier signal and the duration of the meter signal is reduced to zero.

8 Claims, 3 Drawing Figures

PATENTED MAY 14 1974 3,810,385
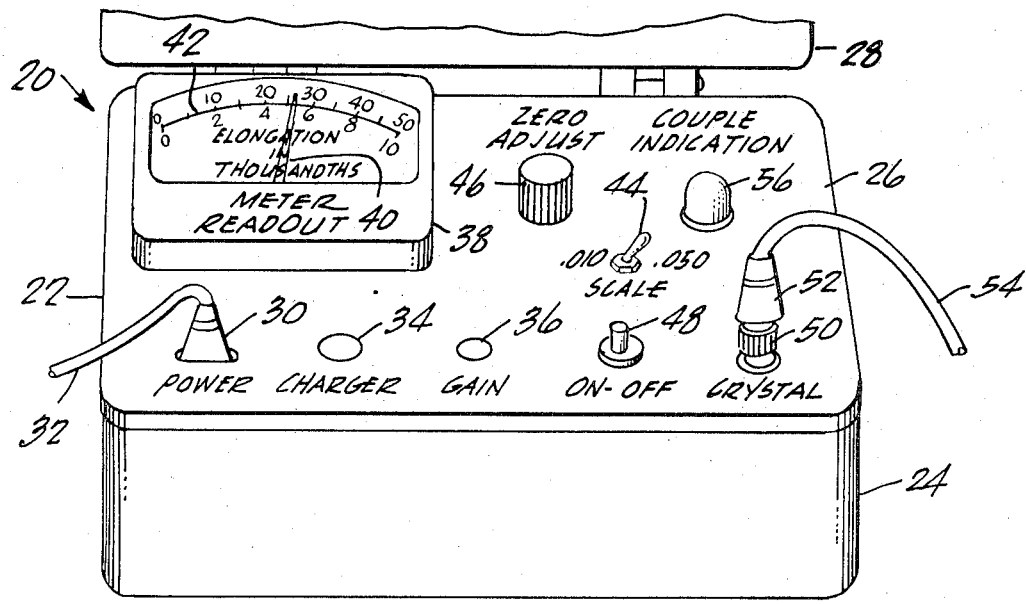
Fig. 1
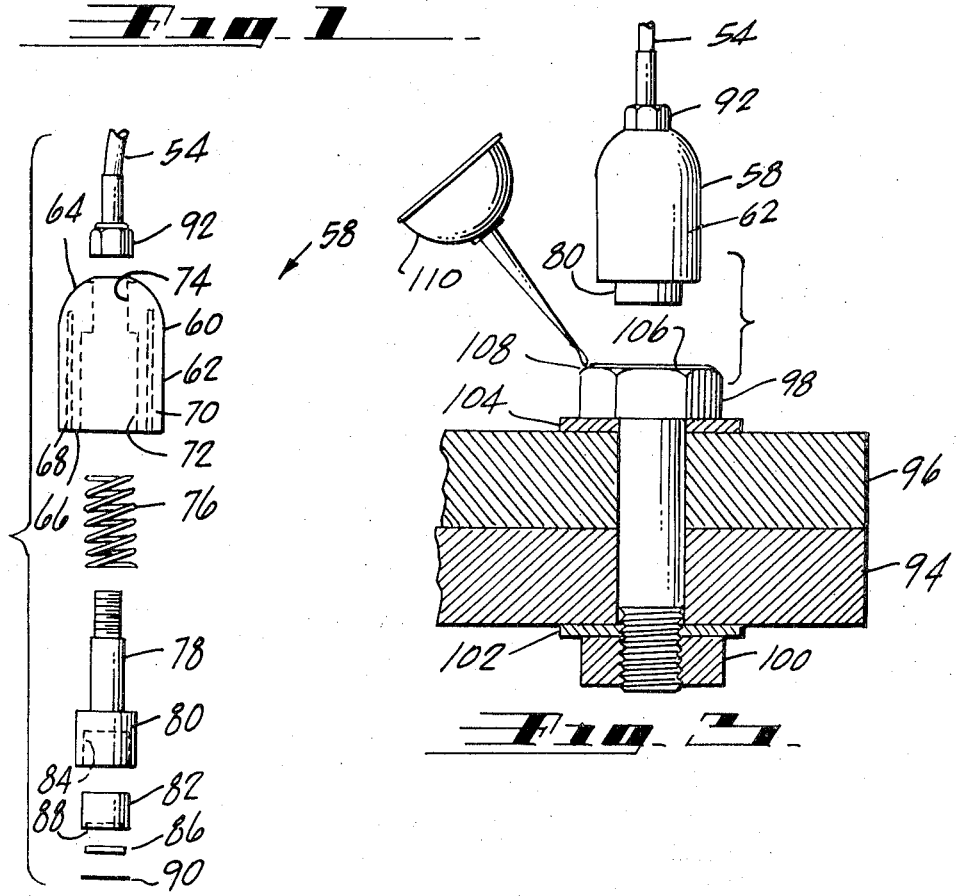
Fig. 3
Fig. 2

TRANSDUCER MEANS FOR ULTRASONIC EXTENSOMETER

This is a division of application Ser. No. 117,635 filed Feb. 22, 1971.

BACKGROUND OF THE INVENTION

Our present invention pertains generally to ultrasonic measuring devices. More particularly, the invention relates to a novel means and method of obtaining highly accurate measurements of the change in length occurring in, for example, a bolt or tie rod during tightening of its nut against the fastened structure.

As is well-known, the load on a bolt is commonly measured by using a torque wrench to tighten the bolt. Such measurements are, however, notoriously inaccurate because of the misleading effects of nut-to-bolt friction and/or nut-to-structure or washer friction. In order to avoid these effects, mechanical and ultrasonic (echo ranging) extensometers have been devised and utilized to measure the elongation of a loaded bolt directly rather than the torque being applied to it. The conventional ultrasonic extensometer is, of course, far more accurate than the mechanical one and can be an ordinary ultrasonic thickness measuring device or gauge suitably adapted to measure the length of a bolt. These conventional ultrasonic thickness gauges are, however, generally limited in accuracy to use in a narrow range of relatively short bolt lengths. Further, they cannot be easily operated using simple adjustments to achieve the extreme accuracy needed in measuring the actual bolt elongation. Coupling of the sonic transducer to the bolt in a properly operative and repeatable manner has also presented a problem.

For use in the manufacture of airframes and missiles, for example, a practical ultrasonic extensometer must measure changes in length to one part in 500 (0.2% accuracy), without any uncertain indications caused by rapid drifts or random noise fluctuations. The small size and easy interpretation of a meter is, of course, highly desirable and a meter displaying indications having 1% accuracy would be suitable, provided it displays indications limited to only the last 0.5 inch of, for example, a bolt being loaded (elongated). The problem in using a meter, however, is to select the particular 0.05 inch of a bolt's length to be measured when bolt lengths of 1 to 12 inches or more are commonly involved.

SUMMARY OF THE INVENTION

Briefly, and in general terms, our invention is preferably accomplished by providing a magnetic transducer assembly including a ring magnet for magnetically coupling a spring-biased crystal transducer to one end of a loaded bolt in; an ultrasonic extensometer which utilizes a vernier means and method for accurately measuring only the actual increase in length or elongation of the loaded bolt, or the like, being tightened against structure which it fastens. Decreases in length or the actual shortening of a gradually unloaded bolt, for example, can also be measured by this extensometer.

The extensometer is preferably a compact and unitary instrument including a magnetic transducer assembly for magnetically coupling a piezoelectric crystal transducer to one end of the bolt through an oil or glycerine film to ensure good ultrasonic coupling therebetween, a conventional pulser/receiver for generating a periodic pulse signal which energizes the transducer that is subsequently again energized by the echo pulse from the far end of the bolt to provide an echo signal which is received and amplified, indicating circuit means for detecting and providing a correct couple indication between the transducer and its associated bolt end, and measuring circuit means for displaying a variable duration meter signal responsively produced by the amplified echo signal and controlled in duration by a vernier signal responsively produced by the pulse signal after a predetermined delay which is adjustable to index the vernier signal a desired amount with respect to the meter signal.

A meter with calibrated (elongation) scale and pointer can be used to display the variable duration meter signal after it has been preferably converted into a meter signal which is additionally variable in magnitude (peak amplitude) in proportion to its duration (i.e., after converting a rectangular waveform to a sawtooth one). The pointer provides a scale reading which corresponds to the magnitude (duration) of the converted meter signal as established by the controlling vernier signal. Suitable indexing of the vernier signal against the meter signal produces a meter reading (of desired bolt elongation) corresponding to the adjusted duration (subsequently converted into magnitude) of the meter signal. Since the meter signal is responsively produced by the amplified echo signal, when the bolt being loaded has been elongated the proper amount, the amplified echo signal then coincides with the indexing vernier signal such that the duration (and magnitude) of the meter signal is reduced to zero. Thus, the meter reading is progressively reduced from its adjusted reading of desired bolt elongation to a zero reading along with the gradual elongation of the bolt to the proper amount.

BRIEF DESCRIPTION OF THE DRAWINGS

Our invention will be more fully understood, and other features and advantages thereof will become apparent, from the description given below of an exemplary embodiment of the invention. The description of the exemplary embodiment of this invention is to be taken in conjunction with the accompanying drawings, in which:

FIG. 1 is a frontal view, perspectively shown, of an illustrative embodiment of an ultrasonic extensometer unit constructed according to our invention;

FIG. 2 is an exploded elevational view of an exemplary embodiment of a magnetic transducer assembly which is used with the extensometer unit shown in FIG. 1; and FIG. 3 is an elevational view, partially in section, of the transducer assembly shown exploded in FIG. 2, two plates fragmentarily shown, and a bolt, nut and washers used to fasten the two plates together.

DESCRIPTION OF THE PRESENT EMBODIMENT

FIG. 1 is a frontal view perspectively shown, of an illustrative embodiment of a portable ultrasonic extensometer unit 20 constructed according to our invention. The unit 20 includes a small rectangular case 22 having a lower housing 24, a panel 26 closing the open upper end of the housing, and a relatively shallow upper cover 28 hinged to the rear wall of the housing for normally covering and protecting the elements mounted to the panel. The panel 26 mounts recessed power input pins which are engaged by the receptacle plug 30 at the end of cable 32 carrying regular 110 volts, 60 c.p.s. power to the unit 20. This alternating voltage is suitably rectified and filtered by conventional rectifier and filter means (not shown) in the housing 24 to provide a direct voltage supply for the various components of the ultrasonic extensometer.

A rechargeable battery (not shown) can also be carried in the housing 24 and connected to power the extensometer unit 20 where regular power is unavailable. A normally covered access opening 34 is provided in the panel 26 for coupling the output connector of a charger to the terminals of the battery mounted in the housing 24. Another normally covered access opening 36 is located next to the charger access opening 34 and allows the insertion of a screw driver to adjust the gain of the extensometer by conventionally varying, for example, the load resistance of the output amplifier which drives a bridge circuit including meter 38.

The meter 38 is mounted on the panel 26, and its pointer 40 indicates against a scale 42 which is linearly divided and calibrated into two ranges of (bolt) elongation. The pointer 40 provides a meter readout with the radially inner calibrations of scale 42 in a range of 0 to 10 thousandths of an inch, and with the radially outer calibrations of the scale in another range of 0 to 50 thousandths of an inch. The selection of either of these ranges on the scale 42 can be made by switch 44 which is also mounted on the panel 26. The range of 0.010 inch is obtained by moving the lever arm of switch 44 to the left from its right position which selects the range of 0.050 inch.

A zero adjust knob 46 mounted on the panel 26 is used to move the pointer 40 and set its position at a desired point along the scale 42. With the selection of the 0.050 inch range as indicated in FIG. 1, for example, the knob 46 can be suitably rotated until the pointer 40 is aligned with the 40 thousandths of an inch mark. By loading or increasing the load on the bolt being measured, the pointer 40 then moves towards zero proportionately with the elongation of the bolt. Thus, in this illustrative embodiment of the invention, when the pointer 40 indicates zero, the bolt has been elongated 0.040 inch.

The initial setting of the pointer 40 on the scale 42 at the exemplary 40 thousandths of an inch mark is an arbitrary zero reference setting. If an elongation of 0.030 inch were desired, the bolt can be loaded until the pointer 40 moves a marking spacing of 0.030 inch to the left of the initial zero reference setting of 0.040 inch, the bolt loading being stopped when the pointer is aligned with the 0.010 inch mark on the 0.050 inch range scale. For greater convenience and simplicity of operation, however, it is preferable to adjust the pointer 40 to a 0.030 inch initial or zero reference setting on scale 42 so that the pointer can be brought to a zero reading when the bolt has been elongated 0.030 inch. This, of course, would preclude the possibility of making any arithmetical errors in determining the required end reading for any particular bolt elongation desired. Note that in this instance the total amount of shortening of the loaded bolt due to a relaxation or reduction of its load, up to the initial zero reference scale setting, is indicated by the pointer 40 against the appropriate range scale.

A power on-off switch 48 mounted on panel 26 can be operated to connect or disconnect the direct voltage supply to the various components of the extensometer unit 20. The switch 48 preferable houses an indicator lamp (not shown) which is connected across the supply lines and energized when the switch is turned on. A pulser/receiver input receptacle 50 is located to the right of the switch 48 on the panel 26, and connector 52 at the end of coaxial cable 54 is normally connected to the receptacle. The cable 54 connects electrically with the faces of a piezoelectric crystal carried in a magnetic transducer assembly at the other end of the cable and which assembly is normally coupled magnetically to one end of a bolt that is to be loaded (elongated). A couple indication lamp 56 on the panel 26 indicates when a correct coupling is obtained or exists between the piezoelectric crystal transducer and the one end of the bolt by becoming or being deenergized. In the absence of a good sonic coupling between the crystal transducer and bolt end, the lamp 56 is energized and lighted in this illustrative embodiment of the invention.

FIG. 2 is an exploded elevational view of an exemplary embodiment of a magnetic transducer assembly 58 which can be used with the extensometer unit 20 of FIG. 1. The transducer assembly 58 includes a ring magnet 60 having a generally cylindrical body 62 with a hemispherical dome 64. The cylindrical body 62 is generally separated into radially inner and outer layers 66 and 68 by a cylindrical isolation sleeve 70. The body 62 can be fabricated of Alnico 5 magnet material and the sleeve 70 can be made of brass, for example. It can be seen that the sleeve 70 extends upward from the lower surface of the body 62 to near the surface of dome 64. The lower portion of the body 62 has a cylindrical central passageway 72 which is axially aligned with a similar but smaller diameter passageway 74 in the body's upper portion.

The transducer assembly 58 further includes a helically coiled spring 76, a coaxial terminal member 78, a transducer mount 80 affixed to the lower end of the terminal member, an acoustical back-up block 82 normally installed in an end space 84 in the terminal member, a piezoelectric crystal 86 which is a disc-shaped wafer element normally mounted in a suitably recessed space 88 in the back-up block, and a cover sheet 90 cemented to the lower end of the back-up block, and the lower face of the crystal. The lower and upper faces of the crystal 86 are silver plated with respective electrical connections soldered thereto. The crystal 86 is suitably mounted to the back-up block 82 and its electrical connections are connected by respective leads (not shown) to the two conductor terminal elements of the coaxial terminal member 78. One of the electrical connections to the crystal 86, can, of course, be a ground (direct metal structure connection. The block 82 is made of a dense metal which attenuates and damps sound in the direction opposite to the open end (lower crystal face) thereof. The cover sheet 90 protects the lower (silver plated) face of the crystal 86 and can be made of aluminum oxide, for example.

The spring 76 is normally contained in the passageway 72 of the ring magnet 60 and is positioned around the body of the coaxial terminal member 78. The upper end portion of the body of terminal member 78 extends through the passageway 74 of the upper member 64 and its threaded end is engaged by a connector 92 at the lower end of coaxial cable 54. The lower end of the spring 76 engages the upper edge (shoulder) surface of the transducer mount 80, and the upper end of the spring engages the upper end (shoulder) surface of the passageway 72. When the cable connector 92 is firmly fastened to the threaded end of the coaxial terminal member 78, proper electrical contact is made between the coaxial cable 54 and the crystal 86 through the terminal member. At the same time, the spring 76 is slightly compressed within the passageway 72 and biases the connector 92 against the top surface of the dome 64. In this condition, the lower end portion of the transducer mount 80 protrudes a short distance below the lower surface of the generally cylindrical body 62.

FIG. 3 is an elevational view, partially in section, of the transducer assembly 58 shown exploded in FIG. 2, two plates 94 and 96, and a bolt 98, nut 100 and washers 102 and 104 used to fasten the two plates together. In order to obtain a good sonic coupling between the transducer assembly 58 and the upper end surface 106 of the bolt 98, a film 108 of liquid which is preferably oil or glycerine is provided from a supply 110 on the bolt's upper surface before the transducer assembly is placed in contact therewith. The ring magnet 60 (FIG. 2) secures the transducer assembly 58 to the bolt's upper surface 106. The magnetic force against the transducer mount 80 compresses the spring 76 further, until the lower surface of the transducer mount becomes generally flush with the lower surface of the magnet body 62. The magnetically induced and spring controlled pressure-contact produced through the liquid (oil) film 108 between the lower surface of the transducer mount 80 and the bolt's upper surface 106 establishes the film's thickness which is usually of the order of about 0.001 inch.

The bolt 98 can, of course, be loaded without disturbing a good sonic coupling by tightening the nut 100. The ring magnet 60 used, however, produces a sufficiently strong and uniformly tight coupling with the upper surface 106 of the bolt 98 such that any ordinary movements of the bolt cannot disrupt or break the satisfactory sonic connection. While the oil film 108 produces and ensures good ultrasonic coupling between the transducer assembly 58 and the bolt 98, it is in this thin film that spurious ringing occurs. The powerful pulse signal which energizes the transducer (crystal) 86 and is subsequently followed by an echo signal from the far end of bolt 98 produces some spurious ringing due to reverberation between the lower surface of transducer assembly 58 (lower face of the crystal 86) and the near end (upper surface) of the bolt. This ringing persists briefly after the pulse signal and is, of course, also included in the echo signal. The measuring circuit means provided in the ultrasonic extensometer 20 is such as to preclude any erroneous or improper response to the spurious ringing portion of the pulse (or echo) signal. While an exemplary embodiment of this invention has been described above and shown in the accompanying drawings, it is to be understood that such embodiment is merely illustrative of, and not restrictive on, the broad invention and that we do not desire to be limited in our invention to the details of construction or arrangement shown and described, for obvious modifications may occur to persons skilled in the art.

We claim:

1. For use in an ultrasonic extensometer and the like, transducer means comprising:
    a transducer element; and
    magnetic means for mounting said transducer element, said transducer element being mounted with respect to said magnetic means so that it can secure said transducer element firmly to selected structure, and said magnetic means including a ring magnet, said ring magnet being positioned to attach to said structure against the surface area generally encircling said transducer element and securing the latter in contact with encircled surface area of said structure, and said ring magnet comprising a generally tubular body having a magnetic, annular, normally lower end for contact with and attachment to said surface area generally encircling said transducer element, said body accommodating and mounting said transducer element therein.

2. The invention as defined in claim 1 further comprising pressure producing means for biasing said transducer element firmly against said encircled surface area of said structure, said pressure producing means including a spring means installed in said body and engaging with said transducer element to urge the same outwardly from said body and against said encircled surface area of said structure.

3. For use in an ultrasonic extensometer and the like, transducer means comprising:
    a transducer element; and
    magnetic means for mounting said transducer element, said transducer element being mounted with respect to said magnetic means so that it can secure said transducer element firmly to selected structure, and said magnetic means including a ring magnet, said ring magnet being positioned to attach to said structure against the surface area generally encircling said transducer element and securing the latter in contact with encircled surface area of said structure, and wherein said ring magnet includes a generally hollow cylindrical body having a radially inner layer of magnet material, a radially outer layer of magnet material and a cylindrical isolation sleeve separating said inner and outer layers of magnet material, said body accommodating and mounting said transducer element therein.

4. The invention as defined in claim 3 wherein said transducer element includes piezoelectric disc and an acoustical back-up block for mounting said disc with a face thereof effectively exposed to receive sonic waves from one general direction, said block being made of a relatively dense material and functioning to attentuate and damp any sonic waves received by said disc from other general directions.

5. For use in an ultrasonic extensometer and the like, transducer means comprising:
    a transducer element;
    magnetic means for mounting said transducer element, said transducer element being mounted with respect to said magnetic means so that it can secure said transducer element firmly to selected structure, and said magnetic means including a ring magnet, said ring magnet being positioned to attach to said structure against the surface area generally encircling said transducer element and securing the latter in contact with encircled surface area of said structure; and
    pressure producing means for biasing said transducer element firmly against said encircled surface area of said structure, and wherein said ring magnet includes a generally hollow cylindrical body having a radially inner layer of magnet material, a radially outer layer of magnet material and a cylindrical isolation sleeve separating said inner and outer layers of magnet material, said body accommodating and mounting said transducer element therein.

6. The invention as defined in claim 5 wherein said pressure producing means includes a spring means installed in said body and engaging with said transducer element to urge the same outwardly from said body.

7. For use in an ultrasonic extensometer and the like, transducer means comprising:
a transducer element;
magnetic means for mounting said transducer element, said transducer element being mounted with respect to said magnetic means so that it can secure said transducer element firmly to selected structure, and said magnetic means including a ring magnet, said ring magnet being positioned to attach to said structure against the surface area generally encircling said transducer element and securing the latter in contact with encircled surface area of said structure; and
pressure producing means for biasing said transducer element firmly against said encircled surface area of said structure, and wherein said transducer element includes a piezoelectric disc and an acoustical back-up block for mounting said disc with a face thereof effectively exposed to receive sonic waves from one general direction, said block being made of a relatively dense material and functioning to attentuate and damp any sonic waves received by said disc from other general directions, and said ring magnet includes a generally hollow cylindrical body having a radially inner layer of magnet material, a radially outer layer of magnet material and a cylindrical isolation sleeve separating said inner and outer layers of magnet material, said body accommodating and mounting said transducer element therein.

8. The invention as defined in claim 7 wherein said pressure producing means includes a helically coiled spring installed in said body and engaging with said transducer element to urge the same outwardly from said body whereby said effectively exposed face of said disc is biased firmly against said encircled surface area of said structure.

* * * * *